United States Patent
Suwa et al.

(10) Patent No.: US 9,890,305 B2
(45) Date of Patent: Feb. 13, 2018

(54) METHOD OF PRODUCING A LAMINATE COMPRISING A CURED ADHESIVE SHEET

(71) Applicant: 3M INNOVATIVE PROPERTIES COMPANY, St. Paul, MN (US)

(72) Inventors: Toshihiro Suwa, Tokyo (JP); Hikaru Takeda, Tokyo (JP)

(73) Assignee: 3M Innovative Properties Company, Saint Paul, MN (US)

( * ) Notice: Subject to any disclaimer, the term of this patent is extended or adjusted under 35 U.S.C. 154(b) by 283 days.

(21) Appl. No.: 14/785,655

(22) PCT Filed: Apr. 22, 2014

(86) PCT No.: PCT/US2014/034907
§ 371 (c)(1),
(2) Date: Oct. 20, 2015

(87) PCT Pub. No.: WO2014/176209
PCT Pub. Date: Oct. 30, 2014

(65) Prior Publication Data
US 2016/0068718 A1    Mar. 10, 2016

(30) Foreign Application Priority Data

Apr. 26, 2013 (JP) ................. 2013-094346

(51) Int. Cl.
*C09J 133/08* (2006.01)
*C09J 5/00* (2006.01)
(Continued)

(52) U.S. Cl.
CPC ............ *C09J 133/08* (2013.01); *B32B 37/06* (2013.01); *B32B 37/10* (2013.01);
(Continued)

(58) Field of Classification Search
CPC ....... C09J 33/08; C09J 4/06; C09J 5/00; C09J 133/06; B32B 37/06; B32B 37/10; B32B 37/1207; B32B 38/0008
See application file for complete search history.

(56) References Cited

U.S. PATENT DOCUMENTS

| | | | |
|---|---|---|---|
| 2005/0095370 A1* | 5/2005 | Ellis | C09J 4/00 427/516 |
| 2010/0097746 A1* | 4/2010 | Toyoda | G02F 1/133308 361/679.01 |

FOREIGN PATENT DOCUMENTS

| | | |
|---|---|---|
| EP | 0646632 | 4/1995 |
| JP | 8-311418 | 11/1996 |

(Continued)

OTHER PUBLICATIONS

International Search Report for PCT International Application No. PCT/US2014/034907 dated Jul. 3, 2014, 4 pages.

*Primary Examiner* — Daniel McNally

(57) ABSTRACT

Problem: To provide a method for producing a laminate comprising a thick, highly transparent cured adhesive sheet exhibiting flow characteristics accompanied by satisfactory fluidity and satisfactory initial adhesion to an adherend before irradiation, and satisfactory hardness (in particular, a high storage modulus) after irradiation. Solution: A method for producing a laminate comprising a first substrate, a second substrate, and a cured adhesive sheet disposed therebetween, the method comprising steps of: forming into a sheet a radiation-curable adhesive sheet precursor comprising a polymer/monomer mixture comprising a partially polymerized (meth) acrylic monomer, a monomer having radiation reactive sites activated by short-wavelength radiation of a first wavelength or less, and a photoinitiator for initiating polymerization of the polymer/monomer mixture and the radiation reactive site-possessing monomer via (Continued)

radiation of a wavelength greater than the first wavelength; irradiating the precursor with radiation of a wavelength greater than the specific wavelength to polymerize the radiation-curable adhesive sheet precursor, forming a radiation-curable adhesive sheet; disposing the radiation-curable adhesive sheet adjacent to at least one surface of the first substrate; disposing the second substrate adjacent to a radiation-curable adhesive sheet; applying heat and/or pressure to the radiation-curable adhesive sheet; and irradiating the radiation-curable adhesive sheet with radiation comprising short-wavelength radiation of a first wavelength or less to obtain a cured adhesive sheet.

12 Claims, 5 Drawing Sheets

(51) Int. Cl.
| | |
|---|---|
| B32B 37/10 | (2006.01) |
| B32B 37/12 | (2006.01) |
| C09J 4/06 | (2006.01) |
| C09J 133/06 | (2006.01) |
| B32B 37/06 | (2006.01) |
| B32B 38/00 | (2006.01) |
| B29C 65/14 | (2006.01) |
| B29C 65/48 | (2006.01) |
| B29C 65/00 | (2006.01) |
| B29L 31/34 | (2006.01) |
| B29C 65/52 | (2006.01) |

(52) U.S. Cl.
CPC ...... *B32B 37/1207* (2013.01); *B32B 38/0008* (2013.01); *C09J 4/06* (2013.01); *C09J 5/00* (2013.01); *C09J 133/06* (2013.01); *B29C 65/1406* (2013.01); *B29C 65/1435* (2013.01); *B29C 65/1483* (2013.01); *B29C 65/1496* (2013.01); *B29C 65/4845* (2013.01); *B29C 65/526* (2013.01); *B29C 66/1122* (2013.01); *B29C 66/343* (2013.01); *B29C 66/45* (2013.01); *B29C 66/952* (2013.01); *B29L 2031/3475* (2013.01); *B32B 2037/1253* (2013.01); *B32B 2305/72* (2013.01); *B32B 2309/02* (2013.01); *B32B 2309/04* (2013.01); *B32B 2309/105* (2013.01); *B32B 2310/0831* (2013.01); *C09J 2203/318* (2013.01); *C09J 2205/31* (2013.01); *C09J 2433/00* (2013.01); *G02F 2201/50* (2013.01); *G02F 2202/023* (2013.01); *G02F 2202/28* (2013.01)

(56) References Cited

FOREIGN PATENT DOCUMENTS

| WO | WO 2011-112508 | 9/2011 |
| WO | WO 2013-025443 | 2/2013 |
| WO | WO 2013-062996 | 5/2013 |

* cited by examiner

METHOD OF PRODUCING A LAMINATE COMPRISING A CURED ADHESIVE SHEET

FIELD OF INVENTION

The present invention relates to a method of producing a laminate comprising a cured adhesive sheet.

BACKGROUND ART

Image display modules of electronic devices such as portable phone terminals, computer displays, and the like, as well as optical members such as touch panels, often have glass or a plastic film laminated thereupon as a surface-protecting layer. Such surface-protecting layers are affixed to the image display module or touch panel via the application of a frame-shaped tape or an adhesive to an outer blank area of the image display part or outside of the effective operating area of the touch panel. As a result, a space is formed between the image display part or effective operating area of the touch panel and the surface-protecting layer.

In recent years, a method of improving the transparency and increasing the clarity of an image has become widely used, in which the space between the surface-protecting layer and the image display module or touch panel is replaced by a transparent material such that the difference in refractive index between the display surface of the surface-protecting layer, touch panel, and image display module is lower than that of air (in other words, a transparent material with a refractive index close to that of glass or plastic). Examples of such transparent materials include pressure-sensitive adhesives, adhesives, silicone gels, and the like. If an adhesive is used, it can be difficult to apply the adhesive only to a specific area, and expensive equipment may be needed for application. In addition, peeling or adherend warping can result from stress generated from contraction, if an adhesive requiring curing is used. Silicone gels present problems of long-term reliability due to low adhesiveness. In contrast to this, a pressure-sensitive adhesive (for example, a pressure-sensitive adhesive (PSA) sheet) can be processed beforehand to a predetermined shape and then applied, has sufficient adhesive strength, and can be reapplied, making such a material effective for applying a surface-protecting layer to an image display module or touch panel.

The surface of an adherend such as an image display module, optical member, or surface-protecting layer may not be flat. The surface of the surface-protecting layer, especially a surface coming in contact with an adhesive sheet, may be printed upon for decorative or light-blocking purposes. In a number of examples, the printed portion may form a three-dimensional surface topography, such as a 10 μm-high raised section, on a surface of the surface-protecting. When an adhesive sheet is used to apply a surface-protecting layer on an image display module or touch panel, there is the problem, for example, that insufficient conformity to the three-dimensional surface topography by the adhesive sheet can lead to spaces being formed upon or in the vicinity of the three-dimensional surface topography. Moreover, warping from the stress caused by deformation of the pressure-sensitive adhesive can cause color patches in adherends that are sensitive to warping, such as LCDs. In order to avoid these problems, it is normally necessary to impart the adhesive sheet with a thickness approximately ten times the height of the three-dimensional surface topography. If a pressure-sensitive adhesive with poor stress alleviation properties is used, the quality demanded when applied may not be met even if the thickness of the material is ten times or more the height of the three-dimensional surface topography.

In addition, there is the problem that, when a thick (for example, 50 μm or greater) adhesive sheet is produced, air bubbles are prone to form in the adhesive sheet itself due to the thickness thereof. Air bubbles are particularly prone to form when the adhesive sheet is produced via steps of applying a fluid, constituted by a pressure-sensitive adhesive component dissolved in a solvent, to the substrate and drying the solvent.

PRIOR ART DOCUMENTS

Document 1 discloses a UV crosslinkable adhesive sheet comprising a (meth)acrylic copolymer of a monomer comprising a (meth)acrylate ester having a UV crosslinkable site; wherein the storage modulus before UV crosslinking is at least $5.0 \times 10^4$ Pa and no more than $1.0 \times 10^6$ Pa at 30° C. and 1 Hz, and no more than $5.0 \times 10^4$ Pa at 80° C. and 1 Hz; and the storage modulus after UV crosslinkage is at least $1.0 \times 10^3$ Pa at 130° C. and 1 Hz.

Patent Documents

Patent Document 1: Japanese Unexamined Patent Application Publication No. 2011-184582A

SUMMARY OF THE INVENTION

Problem to be Solved by the Invention

The inventors have previously invented a UV crosslinkable adhesive sheet containing an acrylic copolymer having a UV crosslinkable site. This adhesive sheet has the advantage of demonstrating satisfactory conformity to a three-dimensional surface topography such as a raised section or bumps, even if the thickness of the sheet is roughly equal to the height of the three-dimensional surface topography (for example, from 20 to 30 μm), by applying heat and/or pressure before the UV crosslinking stage. Moreover, this advantage contributes to, for example, superior adhesive suitability for use with an image display module or optical member (namely, a reduction in spaces and other deficiencies around parts such as raised sections or bumps), and contributes to prevention of color warping during application under reduced internal stress (namely, under conditions such that excessive stress is not placed upon the adherend or adhesive sheet), and the like.

In some applications, typically involving touch panel modules or the like, a thick adhesive sheet is called for in order to create a conforming level difference of 50 μm or more. For example, if a touch panel and a flexible printed circuit board, to which a circuit for controlling the operation of the touch panel is mounted, are connected outside the touch panel module, the adhesive sheet may be required to have a thickness greater than or equal to that of the flexible printed circuit board.

In addition, as the sensitivity of the touch panel increases, electromagnetic radiation emitted from an LCD module may lead to malfunctioning in a capacitive touch panel. The thickness of the adhesive sheet disposed between the touch panel module and the LCD module may be increased in order to prevent such malfunctioning.

When producing a thick adhesive sheet from an adhesive precursor, the use of an adhesive precursor in which essentially no solvent is used and the precursor is converted to a polymer via UV radiation or the like allows air pocket formation within the adhesive sheet to be controlled more easily than in the case of an adhesive sheet formed from an adhesive precursor in which polymerization is performed within a solvent. However, the polymerization of the precursor and the crosslinking of the polymer produced thereby becomes more difficult to control, making it difficult to obtain an adhesive sheet having the desired fluidity.

Means to Solve the Problem

An embodiment of the present invention provides a method for producing a laminate comprising a first substrate, a second substrate, and a cured adhesive sheet disposed between the first substrate and the second substrate, at least one of the first substrate and the second substrate having a three-dimensional surface topography over at least a part of one of the primary surfaces thereof. The method comprises the steps of: forming into a sheet a radiation-curable adhesive sheet precursor comprising a polymer/monomer mixture comprising a partially polymerized (meth)acrylic monomer, a monomer having radiation reactive sites activated by short-wavelength radiation of a first wavelength or less, and a photoinitiator for initiating polymerization of the polymer/monomer mixture and the radiation reactive site-possessing monomer via radiation of a wavelength greater than the first wavelength; irradiating the precursor with radiation of a wavelength greater than the first wavelength to polymerize the radiation-curable adhesive sheet precursor, forming a radiation-curable adhesive sheet; disposing the radiation-curable adhesive sheet adjacent to at least one surface of the first substrate; disposing the second substrate adjacent to the radiation-curable adhesive sheet; applying heat and/or pressure to the radiation-curable adhesive sheet to make the sheet conform to the three-dimensional surface topography; and irradiating the radiation-curable adhesive sheet with the short-wavelength radiation of the first wavelength or less to obtain the cured adhesive sheet.

Another embodiment of the present invention provides a method for producing a laminate comprising a first substrate, a second substrate, and an adhesive sheet disposed between the first substrate and the second substrate, at least one of the first substrate and the second substrate being sensitive to warping. The method comprises the steps of: forming into a sheet a radiation-curable adhesive sheet precursor comprising a polymer/monomer mixture comprising a partially polymerized (meth)acrylic monomer, a monomer having radiation reactive sites activated by short-wavelength radiation of a first wavelength or less, and a photoinitiator for initiating polymerization of the polymer/monomer mixture and the radiation reactive site-possessing monomer via radiation of a wavelength greater than the first wavelength; irradiating the precursor with radiation of a wavelength greater than the first wavelength to polymerize the radiation-curable adhesive precursor forming a radiation-curable adhesive sheet; disposing the radiation-curable adhesive sheet adjacent to at least one surface of the first substrate; disposing the second substrate adjacent to the radiation-curable adhesive sheet; applying heat and/or pressure to the radiation-curable adhesive sheet; and irradiating the radiation-curable adhesive sheet with the short-wavelength radiation of the first wavelength or less to obtain the cured adhesive sheet.

Effect of the Invention

In accordance with the present invention, a method for producing a laminate comprising a thick, highly transparent cured adhesive sheet exhibiting flow characteristics accompanied by satisfactory fluidity and satisfactory initial adhesion to an adherend before irradiation, and satisfactory hardness (in particular, a high storage modulus) after irradiation is provided.

Using a thick sheet allows a sheet to be obtained that is capable of conforming even to large topographies of, for example, 50 µm or greater.

DETAILED DESCRIPTION

Figure 1:
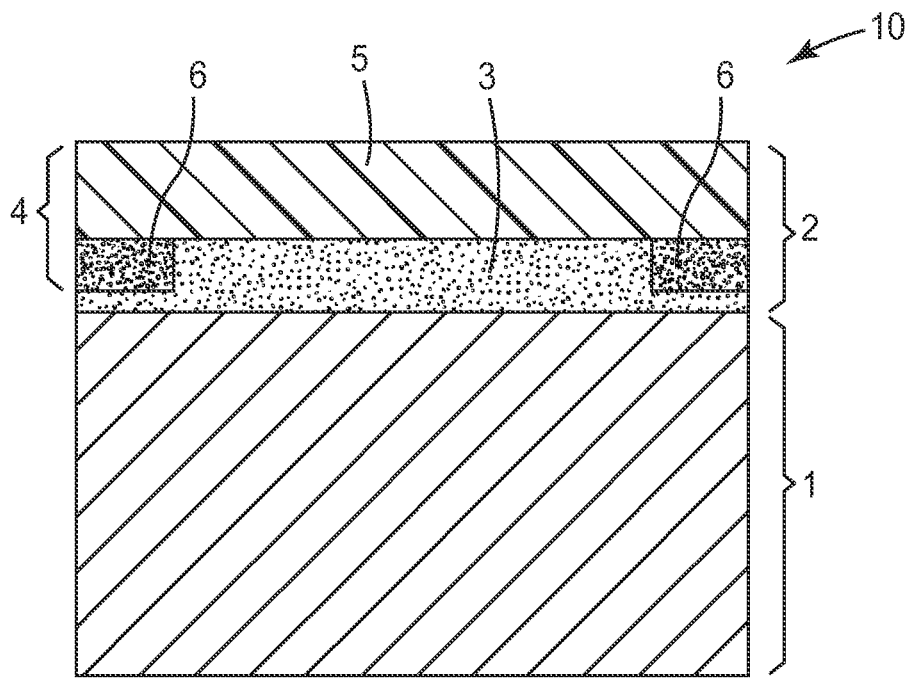
FIG. 1 is a cross-sectional view of one embodiment of an image display device in the form of a laminate comprising a cured adhesive sheet according to the present disclosure.

A representative embodiment of the present invention is described below in further detail for exemplary purposes, but the present invention is not restricted to this embodiment. The description within the present disclosure should not be construed as a complete disclosure of all embodiments of the present invention or of all advantages related to the present invention.

As used in the present disclosure, the term "radiation reactive site" refers to a site that is activated by irradiation and that is capable of reacting with another site. The term "UV crosslinkable site" refers to a site that is activated by UV irradiation and that is capable of crosslinking with another site.

The term "(meth)acrylic" signifies "acrylic" or "methacrylic", and the term "(meth)acrylate" signifies "acrylate" or "methacrylate".

The term "storage modulus" refers to storage modulus at a specific temperature when viscoelastic properties are measured in shear mode at 1 Hz and at a temperature increase rate of 5° C./minute across a temperature range from −40° C. to 200° C.

Examples of radiation that can be used to polymerize and cure the radiation-curable adhesive sheet precursor and radiation-curable adhesive sheet are UV radiation, visible light, and the like. In a typical embodiment, the cured adhesive sheet is an adhesive sheet that has undergone polymerization and formed crosslinks upon subjection to UV irradiation.

In the present disclosure, a method for producing a laminate comprising a thick, highly transparent cured adhesive sheet exhibiting flow characteristics accompanied by satisfactory fluidity and satisfactory initial adhesion to an adherend before irradiation, and satisfactory hardness (in particular, a high storage modulus) after irradiation is provided.

The radiation-curable adhesive sheet precursor used in the production method according to the present disclosure contains essentially no solvent, and the polymer/monomer mixture comprising a partially polymerized (meth)acrylic monomer is polymerized using radiation, thereby allowing a thick radiation-curable adhesive sheet to be produced while preventing air pocket formation, and allowing a highly transparent radiation-curable adhesive sheet to be obtained.

Because the radiation-curable adhesive sheet used in the production method according to the present disclosure is designed to increase adhesive strength upon being irradiated, temporary joints and repositioning can easily be performed at a desired stage before irradiation when the sheet is used in a desired application. Therefore, this sheet can be advantageously used in applications in which a surface-protecting layer is overlaid onto a large adherend (for example, a large liquid crystal module).

The radiation-curable adhesive sheet used in the production method according to the present disclosure has satisfactory fluidity before being irradiated. Thus, after the adhesive sheet is applied to an adherend at a normal working temperature, the adhesive sheet can be made to conform to a raised section, protrusion, or other three-dimensional surface topography on the surface of the adherend (for example, a surface-protecting layer) by applying heat and/or pressure. The crosslinking of the adhesive sheet is subsequently increased via irradiation, resulting in highly reliable adhesion and high strength (in particular, high scratch resistance) because of the high storage modulus of the cured adhesive sheet.

In the present disclosure, a step of forming into a sheet a radiation-curable adhesive sheet precursor comprising a polymer/monomer mixture comprising a partially polymerized (meth)acrylic monomer, a monomer having radiation reactive sites activated by short-wavelength radiation of a first wavelength or less, and a photoinitiator for initiating polymerization of the polymer/monomer mixture via radiation of a wavelength greater than the first wavelength is utilized.

The polymer/monomer mixture comprising a partially polymerized (meth)acrylic monomer encompasses polymers of single (meth)acrylic monomers in which a monomer component comprising a (meth)acrylic monomer is partially polymerized in the presence of a polymerization initiator using UV radiation or another suitable means, as well as copolymers of a plurality of (meth)acrylic monomers. Because the monomer component of the polymer/monomer mixture is partially polymerized and has suitable viscosity (approximately from 500 to 10,000 mPas), the mixture can easily coat an backing or the like, and otherwise exhibits superior ease of handling.

In a preferable embodiment, the (meth)acrylic monomer includes an alkyl (meth)acrylate ester where the number of carbons of the alkyl group is from 2 to 26. Monomers of this type provide favorable wetting properties with regard to the adherend and providing favorable viscoelasticity to the radiation-curable adhesive sheet. Examples of this type of (meth)acrylate alkyl ester include (meth)acrylates of non-tertiary alkyl alcohols wherein the alkyl group has 2 to 26 carbons, mixtures thereof, and the like. Although not restricted to the following, specific examples that can be preferably used include ethyl acrylate, ethyl methacrylate, n-butyl acrylate, n-butyl methacrylate, isobutyl acrylate, isobutyl methacrylate, hexyl acrylate, hexyl methacrylate, n-octyl acrylate, n-octyl methacrylate, 2-ethylhexyl acrylate, 2-ethylhexyl methacrylate, isoamyl acrylate, isooctyl acrylate, isononyl acrylate, decyl acrylate, isodecyl acrylate, isodecyl methacrylate, lauryl acrylate, lauryl methacrylate, tridecyl acrylate, tridecyl methacrylate, tetradecyl acrylate, tetradecyl methacrylate, hexadecyl acrylate, hexadecyl methacrylate, stearyl acrylate, stearyl methacrylate, isostearyl acrylate, isostearyl methacrylate, eicosanyl acrylate, eicosanyl methacrylate, hexacosanyl acrylate, hexacosanyl methacrylate, 2-methylbutyl acrylate, 4-methyl-2-pentyl acrylate, 4-t-butylcyclohexyl methacrylate, cyclohexyl methacrylate, isobornyl acrylate, mixture thereof, and the like.

The amount of (meth)acrylate alkyl ester having from 2 to 26 carbons in the alkyl group is generally about 60 mass % or higher, about 70 mass % or higher, or about 80 mass % or higher, and about 95 mass % or less, about 92 mass % or less, or about 90 mass % or less, with respect to the total mass of the polymer/monomer mixture. If the amount of (meth)acrylate alkyl ester having from 2 to 26 carbons in the alkyl group is about 95 mass % or less with respect to the total mass of the polymer/monomer mixture, the adhesive force of the adhesive sheet can be favorably ensured, and if the amount is about 60 mass % or higher, the elasticity of the adhesive sheet will be in a suitable range, and the wettability of the adhesive sheet with regard to the adherend will be favorable.

The polymer/monomer mixture may include other monomers in addition to the monomers described above to the extent that the properties of the radiation-curable adhesive sheet are not lost. Examples include (meth)acrylic monomers other than the aforementioned, as well as vinyl monomers such as vinyl acetate, vinyl propionate, styrene, and the like.

The polymer/monomer mixture may contain a hydrophilic monomer. By using a hydrophilic monomer, it is possible to improve the adhesive strength of the radiation-curable adhesive sheet and/or impart the adhesive sheet with hydrophilic properties. If an adhesive sheet imparted with hydrophilic properties is used, for example, on an image display device, clouding due to water vapor condensation can be controlled because of the ability of the adhesive sheet to absorb water vapor within the image display device. This is especially advantageous when the surface-protecting layer is of a material having low vapor permeability and/or when the image display device to which the adhesive sheet is applied is used in a high-temperature and/or high-humidity environment.

Examples of such hydrophilic monomers include ethylenically unsaturated monomers having acidic groups such as carboxylic acid, sulfonic acid, or the like; vinyl amide; N-vinyllactam; (meth)acrylamide; (meth)acrylate hydroxyalkyl esters having no more than 4 carbons in the alkyl group; and mixtures thereof. Although not restricted to the following, specific examples include acrylic acid, methacrylic acid, itaconic acid, maleic acid, styrene sulfonic acid, N-vinylpyrrolidone, N-vinylcaprolactam, N,N-dimethyl (meth)acrylamide, N,N-diethyl (meth)acrylamide, (meth)acrylonitrile, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 4-hydroxybutyl acrylate, and mixtures thereof.

A structure capable, for example, of being excited by irradiation and abstracting hydrogen radicals from within the same molecule or from another (meth)acrylic copolymer molecule can be used as the monomer having radiation reactive sites activated by short-wavelength radiation of a first wavelength or less. Examples of such structures include a benzophenone structure, a benzyl structure, an o-benzoyl benzoic ester structure, a thioxantone structure, a 3-ketocoumarin structure, a 2-ethylanthoraquinone structure, a camphorquinone structure, or the like. All of the above structures are capable of being excited by UV irradiation, and of abstracting hydrogen radicals from a (meth)acrylic copolymer molecule when in the excited state. Radicals are thus generated in the (meth)acrylic copolymer, and various reactions take place within the system, such as the formation of crosslinked structures from generated radicals bonding together, the generation of peroxide radicals from reaction with oxygen molecules and the formation of crosslinked structures via the formed peroxide radicals, the abstraction of other hydrogen radicals by the generated radicals, and so on. Finally, the (meth)acrylic copolymer forms cross-linked structures.

In another preferred embodiment, the radiation reactive site has a benzophenone structure. This embodiment is advantageous in terms of transparency and reactivity. A (meth)acrylic copolymer having a benzophenone structure is also advantageous in that it can be cured by UV irradiation alone. Examples of monomers that can be used to obtain a (meth)acrylic copolymer having a benzophenone structure include (meth)acrylic esters having a benzophenone structure, with specific examples including 4-acryloyloxy benzophenone, 4-acryloyloxyethoxy benzophenone, 4-acryloyloxy-4'-methoxy benzophenone, 4-acryloyloxyethoxy-4'-methoxy benzophenone, 4-acryloyloxy-4'-bromo benzophenone, 4-acryloyloxyethoxy-4'-bromo benzophenone, 4-methacryloyloxy benzophenone, 4-methacryloyloxyethoxy benzophenone, 4-methacryloyloxy-4'-methoxy benzophenone, 4-methacryloyloxyethoxy-4'-methoxy benzophenone, 4-methacryloyloxy-4'-bromo benzophenone, 4-methacryloyloxyethoxy-4'-bromo benzophenone, and mixtures thereof.

Because the monomer having radiation reactive sites activated by short-wavelength radiation of a first wavelength or less forms essentially no crosslinkage structures when irradiated with radiation of a wavelength greater than the first wavelength, the greater part of the radiation reactive sites remains unreacted when the mixture thereof with the polymer/monomer mixture (i.e., the radiation-curable adhesive sheet precursor) is irradiated with long-wavelength radiation, greater than the first wavelength, to produce a copolymer thereof with the polymer/monomer mixture. For this reason, the polymerized radiation-curable adhesive sheet conforms well to the three-dimensional surface topography of the adherend and the sheet can be attached to the adherend with mitigated internal stress. The crosslinking reaction proceeds when the sheet is irradiated with the short-wavelength radiation of a first wavelength or less in a subsequent step, and a cured adhesive sheet of satisfactory hardness can be obtained.

The amount of radiation reactive site-possessing monomer is generally about 0.1 mass % or greater, about 0.2 mass % or greater, or about 0.3 mass % or greater with respect to the mass of the polymer/monomer mixture. An amount of radiation reactive site-possessing monomer that is about 0.1 mass % or more of the total mass of the polymer/monomer mixture can increase the adhesiveness of the cured adhesive sheet formed via irradiation to the adherend, enabling a highly reliable bond to be obtained. The effect of increased cured adhesive sheet hardness becomes more pronounced the greater the amount of radiation reactive site-possessing monomer is with respect to the mass of the polymer/monomer mixture.

An appropriate photoinitiator for initiating polymerization of the polymer/monomer mixture and the radiation reactive site-possessing monomer via radiation of a wavelength greater than the first wavelength may be selected according to the type of polymer/monomer mixture and radiation reactive site-possessing monomer.

Examples of photoinitiators include benzyl dimethyl ketal, 1-hydroxycyclohexyl phenyl ketone, 2-methyl-1-[4-(methylthio)phenyl]-2-morpholinopropan-1-one, 2-hydroxy-2-methyl-1-phenylpropan-1-one, 2-benzyl-2-dimethylamino-1-(4-morpholinophenyl)-butan-1-one, 1-[4-(2-hydroxyethoxy)-phenyl]-2-hydroxy-2-methyl-1-propan-1-one, 2,4,6-trimethylbenzoyl diphenylphosphine oxide, 2,6-dimethylbenzoyl diphenylphosphine oxide, benzoyl diethoxyphosphine oxide, bis(2,6-dimethoxybenzoyl)-2,4,4-trimethylpentyl phosphine oxide, benzoin alkyl ethers (i.e. benzoin methyl ether, benzoin ethyl ether, benzoin isopropylether, benzoin isobutylether, n-butyl benzoin ether, and the like), 1-(4-isopropylphenyl)-2-hydroxy-2-methylpropane-1-one, 2-hydroxy-2-methyl-1-phenylpropane-1-one, p-tert-butyl trichloroacetophenone, p-tert-butyl dichloroacetophenone, benzyl, acetophenone, thioxanthones (2-chlorothioxanthone, 2-methylthioxanthone, 2,4-diethylthioxanthone, 2,4-diisopropylthioxanthone), camphorquinone, 3-ketocoumarin, anthraquinones (e.g., anthraquinone, 2-ethylanthraquinone, α-chloroanthraquinone, 2-tert-butyl anthraquinone, and the like), acenaphthene, 4,4'-dimethoxybenzyl, 4,4'-dichlorobenzyl, and the like. Examples of commercially available photoinitiators include those sold under the tradenames Irgacure and Darocur by BASF, and under the tradename Velsicure by Velsicol.

The above compounds can be used individually or in mixtures of two or more types. A photoinitiator and a sensitizer may also be used together. The amount of photoinitiator used per 100 parts by mass polymer/monomer mixture is generally at least about 0.01 parts by mass and no more than about 2 parts by mass.

In addition to the components mentioned above, a polymerization inhibitor can be added to the radiation-curable adhesive sheet precursor. The use of a polymerization, inhibitor allows for easy control of the degree of polymerization, and for easy adjustment of the storage modulus of the polymerized radiation-curable adhesive sheet to within a range such that the sheet satisfactorily conforms to the three-dimensional surface topography and a bond with reduced internal stress is possible.

In the present disclosure, a polymerization inhibitor and a chain transfer agent can be used together. Various polymerization inhibitors generally used in radical polymerization can be used as the polymerization-delaying agent. Examples of polymerization inhibitor include α-methylstyrene dimers; quinones such as o-, m-, or p-benzoquinone; nitro compounds such as nitrobenzene, o-, m-, or p-dinitrobenzene, or 2,4-dinitro-6-chlorobenzene; amines such as diphenylamine; catechol derivatives such as tertiary butyl catechol; 1,1-diphenyl ethylene, and the like. These may be used singly or in combinations of two or more types.

From about 0.05 to 10 parts by mass polymerization inhibitor can be added per 100 parts by mass polymer/monomer mixture. Almost no effects will be yielded if the amount added is less than about 0.05 parts by mass, and productivity will be negatively affected if the amount added exceeds about 10 parts by mass.

Examples of chain transfer agents include alkyl mercaptans such as n-hexyl mercaptan, n-octyl mercaptan, t-octyl mercaptan, n-dodecyl mercaptan, t-dodecyl mercaptan, and n-stearyl mercaptan; xanthogen compounds such as dimethyl xanthogen sulfide, diethyl xanthogen disulfide, and diisopropyl xanthogen disulfide; thiuram compounds such as tetramethylthiuram disulfide, tetraethylthiuram disulfide, and tetramethylthiuram monosulfide; phenol compounds such as 2,6-di-t-butyl-4-methylphenol and styrenated phenol; allyl compounds such as acrolein, methacrolein, and allyl alcohols; halogenated hydrocarbon compounds such as dichloromethane, dibromomethane, carbon tetrachloride, carbon tetrabromide, and ethylene bromide; vinyl ethers such as α-benzyloxy styrene, α-benzyloxy acrylonitrile, and α-benzyloxy acrylamide; hydrocarbons such as triphenylethane and pentaphenylethane; thioglycolic acid; thiomaleic acid; 2-ethylhexyl thioglycolate; turpenolene; α-terpinene; γ-terpinene; dipentene; and the like. One or more types of these chain transfer agents can be used.

The amount of chain transfer agent used is normally from about 0.1 to 5 parts by weight, preferably from about 0.2 to 3 parts by weight, per 100 parts by weight polymer/monomer mixture. The concurrent use of a chain transfer agent can improve polymerization stability.

In order to promote control of the degree of polymerization, it is also effective to adjust the amount of polymerization initiator or the intensity of the applied radiation in addition to using the polymerization-delaying agents or chain transfer agents described above.

In addition to the components described above, the radiation-curable adhesive sheet precursor may also contain optional components. Examples of optional components include fillers, antioxidants, and the like.

The radiation-curable adhesive sheet precursor is mixed using a desired method, and formed into a sheet using a conventionally known method such as solution casting, extrusion, or the like. In such cases, the adhesive sheet can have a release film, such as a silicone treated polyester film, polyethylene film, or the like, on one side or both sides thereof.

The thickness of the radiation-curable adhesive sheet precursor, after being formed into a sheet, can be set as appropriate according to the application, and can be, for example, about 50 μm or greater. One standard for determining the thickness of the radiation-curable adhesive sheet precursor is the height of the three-dimensional surface topography on the surface of the adherend.

The radiation-curable adhesive sheet precursor according to the present disclosure can suppress deficiencies such as void spaces, irregularities, and the like. In an embodiment in which the surface of the adherend is essentially flat, if the height of the three-dimensional surface topography on the surface of the adherend is determined with respect to a direction perpendicular to the major surface of the adherend, the thickness of the radiation-curable adhesive sheet precursor can be about 0.8 times or more, about 1 times or more, or about 1.2 times or more, and about 10 times or less, about 5 times or less, or about 3 times or less the maximum thickness of the three-dimensional surface topography.

Using the radiation-curable adhesive sheet precursor according to an embodiment of the present disclosure, malfunctioning in a capacitive touch panel due to electromagnetic radiation generated by an LCD module can also be prevented. In this embodiment, the thickness of the radiation-curable adhesive sheet precursor disposed between the touch panel module and LCD module can be, for example, at least about 250 μm, and more preferably at least about 500 μm.

During the step of irradiating the radiation-curable adhesive sheet precursor with radiation of a wavelength greater than the first wavelength to polymerize the radiation-curable adhesive sheet precursor, radiation comprising effectively only radiation of a wavelength greater than the first wavelength is applied. Subsequently, the reactive sites of the monomer having radiation reactive sites activated by short-wavelength radiation of a first wavelength or less within the precursor are not activated. "Comprising effectively only radiation of a wavelength greater than the first wavelength" also encompasses instances in which the reactive sites of the monomer are not activated, even if slight amounts of the short-wavelength radiation of the first wavelength or less are present.

The first wavelength can be selected according to the type of polymer/monomer mixture and radiation reactive site-possessing monomer used. For example, a wavelength within the UV range can be selected. It is also possible to select a wavelength in the near UV range (from 200 to 380 nm), and polymerize the radiation-curable adhesive sheet precursor using radiation having a greater wavelength.

As a method of irradiating the precursor with radiation of a wavelength greater than the selected first wavelength, it is possible to, for example, to select an irradiation apparatus light source and perform irradiation using an irradiation apparatus emitting only radiation of a wavelength greater than the first wavelength.

It is also possible to interpose a filter that effectively blocks (for example, to a transmittance of about 5% or less, preferably about 1% or less) radiation of the first wavelength or less between the precursor and the light source, and irradiate the precursor with radiation of a wavelength greater than the first wavelength. If the precursor is coated on a liner, it is also acceptable to add a UV absorber to the liner that effectively blocks radiation of the first wavelength or less. Thus, if the radiation source is positioned adjacent to the liner, radiation at a wavelength of the first wavelength or less can be effectively blocked during the irradiation of the precursor.

The storage modulus of the radiation-curable adhesive sheet obtained as described above is preferably no more than about $5.0 \times 10^4$ Pa at 80° C. and 1 Hz. A storage modulus of no more than about $5.0 \times 10^4$ Pa at 80° C. and 1 Hz has the advantage that, when being applied to an adherend, the radiation-curable adhesive sheet is capable of flowing, particularly when it is heated, so as to conform to the three-dimensional surface topography of the adherend within a predetermined amount of time (for example, from a matter of seconds to a matter of minutes) without gaps being formed in the vicinity thereof; or color patches arising from warping caused by stress generated by deformation of the adhesive sheet can be suppressed, even in the case of adherends that are sensitive to warping, such as LCDs.

The storage modulus of the radiation-curable adhesive sheet can be modified by varying the type, molecular weight, or proportion of the monomers constituting the (meth)acrylic copolymer contained in the adhesive sheet, the degree of polymerization of the (meth)acrylic copolymer, the type and proportion of the plasticizer, and so on. For example, storage modulus tends to increase if an ethylenically-unsaturated monomer having an acid group is used. Likewise, storage modulus tends to decrease with increasing amounts of, for example, (meth)acrylic alkyl ester having from 2 to 26 carbons in the alkyl group; (meth)acrylic hydroxyalkyl ester having no more than 4 carbons in the alkyl group; (meth)acrylate containing an oxyethylene group, an oxypropylene group, an oxybutylene group, or a group in which a plurality of these are bonded together; or (meth)acrylate having a carbonyl group in an alcohol residue. Increasing the degree of polymerization of the (meth) acrylic copolymer also tends to increase the storage modulus.

One embodiment of the present disclosure provides a method of producing a laminate comprising a first substrate, a second substrate, and a cured adhesive sheet disposed therebetween, and at least one of the substrates has a three-dimensional surface topography on at least part of one of the primary surfaces thereof.

In the method according to the present embodiment, the radiation-curable adhesive sheet is disposed adjacent to a substrate so that the radiation-curable adhesive sheet will contact and conform to the three-dimensional surface topography of the substrate when heat and/or pressure is applied thereto. According to the above method, the space around the three-dimensional surface topography can be filled by the radiation-curable adhesive sheet, and the formation of voids in the vicinity of the three-dimensional surface topography is suppressed. More specifically, the satisfactory fluidity of the radiation-curable adhesive sheet alleviates internal stress in the adhesive sheet on the surface of the substrate having the three-dimensional surface topography, and the laminate can be formed with satisfactory wetting properties. While not limited thereto, an example of the configuration of a laminate to which the above method is applied is one in which the first substrate is a surface-protecting layer having a three-dimensional surface topography such as a raised section or a protrusion, and the second substrate is an image display module or touch panel having or lacking such a three-dimensional surface topography.

The order of the steps in the above method is not limited to that given above.

In one example, after a radiation-curable adhesive sheet is sandwiched between a first substrate and a second substrate, heat and/or pressure is applied to the radiation-curable adhesive sheet. This example has the advantage that the formation of voids in the vicinity of the three-dimensional surface topography can be prevented and a satisfactory bond obtained both in cases where one of the first substrate and the second substrate has a three-dimensional surface topography on an adhering surface as well as in cases where both the first substrate and the second substrate have a three-dimensional surface topography on an adhering surface. An example of a configuration in which both the first substrate and the second substrate have a three-dimensional surface topography is one in which the first substrate is a surface-protecting layer and the second substrate is a polarizing plate (to which the adhesive sheet is applied) attached to an image display module.

In this example, the radiation-curable adhesive sheet is first disposed adjacent to at least one surface of the first substrate, and the second substrate is disposed adjacent to the radiation-curable adhesive sheet. At this point, the radiation-curable adhesive sheet is sandwiched between the first substrate and the second substrate so that the three-dimensional surface topography faces toward the radiation-curable adhesive sheet. Next, heat and/or pressure is applied to the radiation-curable adhesive sheet, causing the radiation-curable adhesive sheet to conform to the three-dimensional surface topography.

In the example described above, at least one of the first substrate and the second substrate is at least partially transparent so that radiation comprising short-wavelength radiation of the first wavelength or less can be applied therethrough. For example, if one of the first substrate and the second substrate has a three-dimensional surface topography, and the three-dimensional surface topography does not transmit radiation, the radiation will not be transmitted directly below the three-dimensional surface topography part when irradiation is performed from the side of the substrate having the three-dimensional surface topography. However, the radiation-curable adhesive sheet will still be cured to some extent even in non-irradiated parts due to the diffusion of radicals formed in the irradiated parts. In such cases, if the substrate not having a three-dimensional surface topography is a transparent substrate such as a touch panel, it is possible to irradiate the part of the radiation-curable adhesive sheet corresponding to the three-dimensional surface topography part by performing irradiation from the side of the substrate not having a three-dimensional surface topography, enabling more uniform curing of the radiation-curable adhesive sheet.

Another embodiment of the present disclosure provides a method of producing a laminate comprising a first substrate, a second substrate, and a cured adhesive sheet disposed therebetween, and at least one of the substrates is sensitive to warping. In the context of the present disclosure, "sensitive to warping" means that decreases in performance are liable to result from warping, and refers to, for example, the tendency of color patches to form in an LCD due to warping. In particular, substrates sensitive to warping readily exhibit optical distortion arising from localized stress in the substrate. Examples of substrates that are sensitive to warping include LCDs, active matrix organic light-emitting diode (AMOLED) displays, 3D lenses used in 3D image displays such as 3D televisions, and the like.

In one example of the present embodiment, after a radiation-curable adhesive sheet is sandwiched between a first substrate and a second substrate, heat and/or pressure is applied to the radiation-curable adhesive sheet. In another example, a radiation-curable adhesive sheet is disposed adjacent to a first substrate that is sensitive to warping or that is not sensitive to warping, heat and/or pressure is applied to the open face of the radiation-curable adhesive sheet, and a second substrate that is sensitive to warping is disposed adjacent to the radiation-curable adhesive sheet. The radiation-curable adhesive sheet according to the present disclosure has satisfactory fluidity and pliability before being irradiated. The advantage is thereby obtained that the application of excessive stress to the substrate when the sheet is bonded to a substrate that is sensitive to warping can be prevented, and a bond in which internal stress is alleviated is possible. The various steps in the present embodiment can be performed in the same order as given in the above embodiment using a substrate having a three-dimensional surface topography.

In the step of applying heat and/or pressure to the radiation-curable adhesive sheet of the present embodiment, the heat and/or pressure can be applied using a convection oven, hot plate, heat press, heat laminator, autoclave, or the like. In order to enhance the fluidity of the radiation-curable adhesive sheet so that the radiation-curable adhesive sheet will more efficiently conform to the shape of the substrate, pressure is preferably applied, at the same time as heat, using a heat laminator, heat press, autoclave, or the like. Applying pressure with an autoclave is particularly advantageous for removing air pockets or voids from the radiation-curable adhesive sheet. The temperature to which the radiation-curable adhesive sheet is heated can be any temperature at which the radiation-curable adhesive sheet softens or flows so to sufficiently conform to the shape of the substrate, and generally can be about 30° C. or higher, about 40° C. or higher, or about 60° C. or higher, and about 150° C. or lower, about 120° C. or lower, or about 100° C. or lower. If pressure is applied to the radiation-curable adhesive sheet, the applied pressure generally can be about 0.05 MPa or more, or about 0.1 MPa or more, and about 2 MPa or less, or about 1 MPa or less.

The radiation comprising short-wavelength radiation of the first wavelength or less is applied in order to activate the reactive sites of the radiation reactive site-possessing monomer and cause a crosslinking reaction. During this crosslinking step, both short-wavelength radiation of the first wavelength or less and also radiation of wavelengths greater than the first wavelength may be used.

UV radiation, visible light, or the like can be used as the radiation. If UV radiation is used, irradiation can be performed using a general UV irradiation apparatus, such as a belt conveyor type ultraviolet light irradiating device using a low-pressure mercury lamp, moderate-pressure mercury lamp, high-pressure mercury lamp, ultra-high-pressure mercury lamp, xenon lamp, metal halide lamp, electrode-free lamp, LED, or the like as a light source. In such cases, the amount of UV irradiation is generally from about 500 mJ/cm$^2$ to approximately 5,000 mJ/cm$^2$.

In one embodiment of the present disclosure, because different wavelengths of radiation can be used in the various steps of preparing the polymer/monomer mixture, i.e. polymerizing the radiation-curable adhesive sheet precursor and crosslinking the radiation-curable adhesive sheet, a filter or the like capable of selecting desired radiation wavelength(s) may be used in the various steps, thereby allowing all of the steps described above to be performed using a single irradiation apparatus and/or source.

For exemplary purposes, an embodiment in which the first substrate is a surface-protecting layer having a raised section as a three-dimensional surface topography on the surface and the second substrate is an image display module or touch panel will be described with reference to FIGS. 1 and 2.

The surface-protecting layer is disposed on the outermost surface of the image display module or touch panel, and protects the same from the exterior environment. The surface-protecting layer can be any layer conventionally used as a protective material for an image display module or touch panel, examples thereof including films of acrylic resins such as polymethyl methacrylate (PMMA), polycarbonate resin films, films of polyester resins such as polyethylene terephthalate (PET), or a sheet of glass. While not limited thereto, an example of the thickness of the film or glass sheet is from about 0.1 mm to about 5 mm.

The surface-protecting layer may also include a layer for imparting functions or properties, such as, wear resistance, abrasion resistance, stain resistance, anti-reflective properties, static resistance, or the like. This layer may be on the viewer side of an image display module or the user side of a touch panel. A layer for imparting wear resistance and abrasion resistance can be formed by applying and curing a curable resin composition capable of forming a hard coating. For example, a coating material consisting of colloidal silica and partial condensation products of a silane mixture, the primary component of which is alkyl trialkoxysilane, can be applied, and then heat-cured to form a cured coating; or a coating material, the primary component of which is a multi-functional acrylate, can be applied, and then cured using UV irradiation to form a cured coating. In order to ensure stain resistance, a resin layer containing an organo-silicon compound, a fluoride compound, or the like can be formed. In order to obtain static resistance, a resin layer containing a surfactant, an anti-static agent, conductive particles, and the like can be formed. The layer for imparting these functions or properties preferably does not impede the transparency of the surface-protecting layer, and is preferably as thin as possible, within the extent that the functions of the layer can be demonstrated. The thickness of the function-imparting or property-imparting layer is generally from about 0.05 µm to about 10 µm, but is not limited thereto.

The embodiment described here may have an additional layer, such as a printed layer and a deposited layer, on part of the surface of the surface-protecting layer adjacent to the radiation-curable adhesive sheet, and a raised section is formed on this surface of the surface-protecting layer. The printed layer or deposited layer is formed, for example, in a frame-like shape on an exterior periphery of the image display module and functions as a light-blocking layer concealing that area from view. The thickness of the printed layer or deposited layer used as such a light-blocking layer is generally from about 10 µm to about 20 µm if it is a black color having high light blocking effects, or from about 40 µm to about 100 µm if white, red, or another color that readily transmits light.

Examples of the image display module include, but are not limited to, reflective and back-lit LCD units, plasma display units, electroluminescence (EL) displays, electronic paper, and the like. The display surface of the image display module can have additional layers (one layer or multiple layers) such as a light polarizing plate (which may have a surface with recesses and protrusions) for example. A touch panel as described below may also be present on the display surface of the image display module.

Touch panels are transparent thin-film shaped devices, whereby when a user touches or presses a certain position on the touch panel using a finger or pen (stylus), that position can be detected and specified. Furthermore, when a plurality of points are simultaneously touched, motions such as the subject movements, rotation, image zoom, and the like can be directly inputted. The position detection method is generally a resistance film method that is operated by the pressure applied on the touch panel, an electrostatic capacitance method that detects the change in electrostatic capacitance between the fingertip and the touch pane, or the like. The touch panel is provided on an image display device such as a CRT display, a liquid crystal display, or the like, and is used in mobile terminals such as ATMs, PCs (personal computer), mobile phones, and portable devices such as PDAs and the like.

FIG. 1 is a cross-sectional view of one embodiment of an image display device in the form of a laminate comprising a cured adhesive sheet. An image display device 10 has a structure in which a cured adhesive sheet 3 and a surface-protecting layer 4 are laminated in that order upon the surface of an image display module 1. The surface-protecting layer 4 is constituted by a continuous layer 5 and a light-blocking layer 6 (on the cured adhesive sheet 3 side) provided on a portion of the undersurface of the continuous layer 5, forming a raised section thereon. The light-blocking layer 6 is formed by blending a colorant into a curable resin composition coating solution, applying the coating solution to a specific area of the continuous layer 5 using screen printing or another suitable method, and curing the coating using UV irradiation or another suitable curing method. The cured adhesive sheet 3 is applied to a surface of a surface-protecting layer 4 having the raised section. Because the cured adhesive sheet 3 is heated and/or pressurized before curing, the sheet sufficiently conforms to the raised section formed in the light-blocking layer 6, and no voids are formed in the vicinity of the raised section. Also, because the remaining internal stress of the cured adhesive sheet is alleviated, display deformation in the image display device can be prevented. The image display device 10 may be obtained by applying a laminate 2, for example, formed from the surface-protecting layer 4 and the cured adhesive sheet 3, to the image display module 1.

Figure 2:
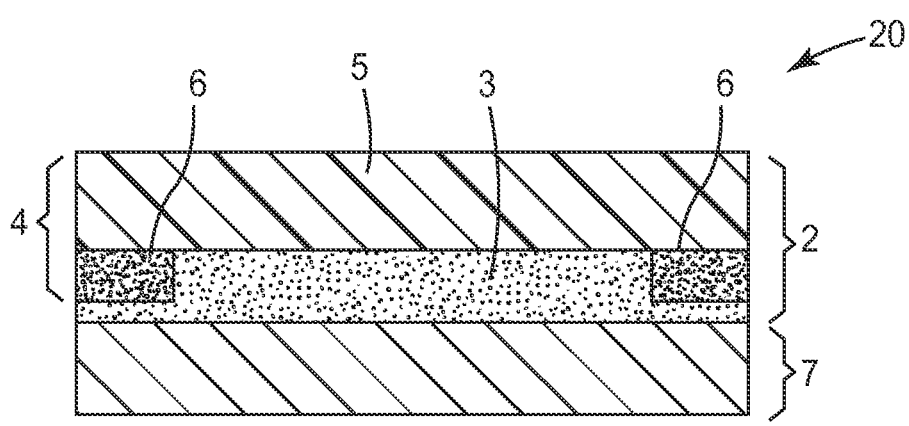
FIG. 2 is a cross-sectional view of one embodiment of a touch panel unit in the form of a laminate comprising a cured adhesive sheet according to the present disclosure.

FIG. 2 is a cross-sectional view of one embodiment of a touch panel unit in the form of a laminate comprising a cured adhesive sheet. A touch panel unit 20 has a structure in which a cured adhesive sheet 3 and a surface-protecting layer 4 are laminated, in that order, upon the surface of a touch panel 7. The structure of the laminate 2, in which the cured adhesive sheet 3 and surface-protecting layer 4 are layered in that order, is the same as that shown in FIG. 1. Because the cured adhesive sheet 3 is heated and/or pressurized before curing, the sheet sufficiently conforms to the raised section formed in the light-blocking layer 6, and no voids are formed in the vicinity of the raised section. The touch panel unit 20 is obtained by applying laminate 2, for example, formed from the surface-protecting layer 4 and the cured adhesive sheet 3, to the touch panel 7. An image display module (not illustrated) having a display surface on an upper side may also be attached on an underside of the touch panel 7 either directly or with another adhesive sheet therebetween.

EXAMPLES

The present invention is described in further detail hereafter using examples, but the present invention is not limited by these examples.
<Producing a Radiation-Curable Adhesive Sheet>

ABBREVIATIONS

2-EHA: 2-ethylhexyl acrylate
ISTA: isostearyl acrylate (available from Osaka Organic Chemical Industry Ltd)
AA: acrylic acid
AEBP: 4-acryloyloxyethoxy benzophenone
AMSD: α-methylstyrene dimer (2,4-diphenyl-4-methyl-1-pentene)
Irg651: Irgacure® 651 (2,2-dimethoxy-1,2-diphenylethane-1-one) (available from BASF Corporation)
DarTPO: Darocure® TPO (2,4,6-trimethylbenzoyl diphenylphosphine oxide) (available from BASF Corporation)
8172P: 3M OPTICALLY CLEAR ADHESIVE 8172P (with UV absorber) commercially available from 3M Company, St. Paul, Minn.

Example 1

A mixture of 37.5 parts by mass 2-EHA, 50.0 parts by mass ISTA, 12.5 parts by mass AA, and 0.04 parts by mass Irg651 was prepared, thoroughly mixed in a glass container, and purged with nitrogen to remove dissolved oxygen, after which the mixture was UV-irradiated for several minutes using a low-pressure mercury lamp and partially polymerized to obtain a polymer/monomer mixture. The viscosity of the obtained polymer/monomer mixture was approximately 670 mPa·s.

Figure 3:
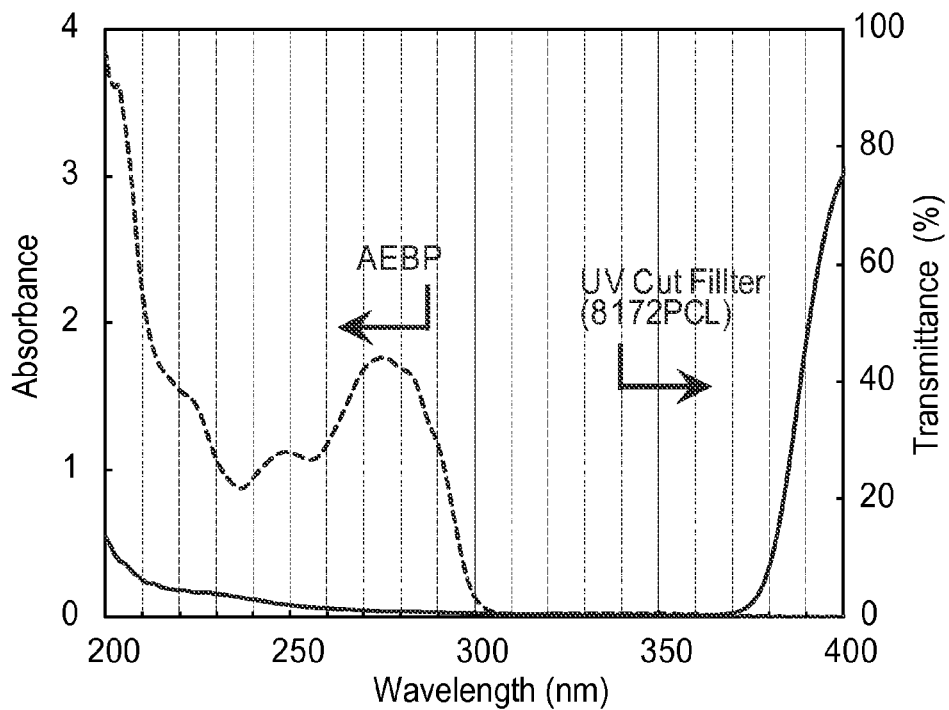
FIG. 3 shows an example of the absorption spectrum of a radiation reactive site-possessing monomer and a transmission spectrum of a filter allowing for radiation wavelength selection.

0.95 parts by mass AEBP (radiation reactive site-possessing monomer), 0.40 parts by mass (polymerization inhibitor), and 1.00 parts by mass DarTPO (photoinitiator) were added to 100 parts by mass of the polymer/monomer mixture, the mixture was stirred, and a radiation-curable adhesive sheet precursor was obtained. As shown in FIG. 3, AEBP absorbs UV radiation of 310 nm or less. The absorption spectrum shown in FIG. 3 was obtained by measuring a 0.004 mass % cyclohexane solution of AEBP along a 10 mm path using a Hitachi U-4100 spectrophotometer.

Using a knife coater, the obtained radiation-curable adhesive sheet precursor was coated between two sheets of silicone release-treated film (product name SP-PET-01-50-Bu; produced by Panac Corp.). The gap of a knife coater was adjusted to form a 100 μm thick sheet of the radiation-curable adhesive sheet precursor.

After 8172P was applied to both sheets of silicone release-treated film, irradiation was performed from one surface only for 15 minutes using a low-pressure mercury lamp. The intensity of the radiation was measured using a Topcon Technohouse UVR-2/UD-40 (available from Topcon Technohouse Corporation). The total amount of UV energy passing through 8172P was approximately 1000 mJ/cm². Next, UV irradiation was similarly performed for 15 minutes from the other surface to obtain a radiation-curable adhesive sheet.

As shown in FIG. 3, 8172P transmits radiation of wavelengths greater than about 370 nm. The transmission spectrum shown in FIG. 3 was obtained by measuring 8172P using a Hitachi U-4100 spectrophotometer.

Figure 4:
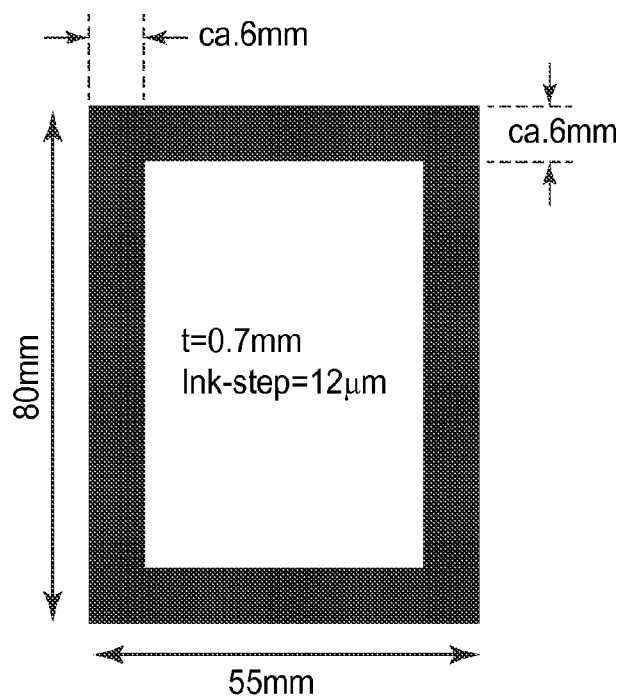
FIG. 4 is a plan view of one example of a substrate having a three-dimensional surface topography.

The silicone release-treated film was removed from one surface of the radiation-curable adhesive sheet, and the sheet was applied to a 85 mm×60 mm×0.7 mm glass sheet (EAGLE2000®; produced by Corning) using a rubber roller. Next, the silicone release-treated film was removed from the other surface of the radiation-curable adhesive sheet, and the sheet was applied to a substrate having the three-dimensional surface topography, as shown in FIG. 4 (a 80 mm×55 mm×0.7 mm glass sheet (EAGLE2000®; produced by Corning Incorporated, Corning, N.Y.), with 15 μm-thick printing on the periphery thereof, using a Takatori TPL-0209MH bonding process machine (available from Takatori Corporation). The application conditions were as follows.
Pressure during application: 0.01 MPa
Application time: 5 seconds
Vacuum pressure: 30 Pa After being applied, the sheet was left in an autoclave for 30 minutes at 60° C. and 0.5 MPa to obtain a laminate comprising a radiation-curable adhesive sheet.

Next, UV irradiation was performed using an F-300 UV irradiator (H bulb, 120 W/cm) manufactured by Heraeus Noblelight Fusion UV K.K. from the side of the substrate having the three-dimensional surface topography, the radiation-curable adhesive sheet was irradiated with short-wavelength radiation of a wavelength less than a first wavelength, in this case about 370 nm, and a laminate comprising a cured adhesive sheet was produced. The total amount of UV energy as measured using an EIT UV POWER PUCK® II UV meter (available from EIT, LLC, Sterling, Va.) was 2,214 mJ/cm² for UV-A (from 320 to 390 nm), 1,692 mJ/cm² for UV-B (from 280 to 320 nm), 196 mJ/cm² for UV-C (from 250 to 260 nm), and 2,232 mJ/cm² for UV-V (from 395 to 445 nm).

Example 2

A radiation-curable adhesive sheet was produced in a manner similar to that of Example 1, except that the amount of AMSD and DarTPO per 100 parts by mass polymer/ monomer mixture was adjusted to 0.20 parts by mass and 0.60 parts by mass, respectively.

Example 3

A radiation-curable adhesive sheet was produced in a manner similar to that of Example 1, except that the amount of AMSD and DarTPO per 100 parts by mass polymer/monomer mixture was adjusted to 0.10 parts by mass and 0.60 parts by mass, respectively.

Example 4

A radiation-curable adhesive sheet was produced in a manner similar to that of Example 1, except that no AMSD was added, the amount of DarTPO was adjusted to 0.60 parts by mass per 100 parts by mass polymer/monomer mixture, and the radiation-curable adhesive sheet precursor was UV-irradiated using an F-300 UV irradiator (H bulb, 120 W/cm) manufactured by Fusion UV Systems Japan instead of a low-pressure mercury lamp. The total amount of irradiated UV energy as measured using an EIT UV POWER PUCK® II UV meter was 76 mJ/cm$^2$ for UV-A (from 320 to 390 nm), 0 mJ/cm$^2$ for UV-B (from 280 to 320 nm), 0 mJ/cm$^2$ for UV-C (from 250 to 260 nm), and 690 mJ/cm$^2$ for UV-V (from 395 to 445 nm).

A laminate comprising a radiation-curable adhesive sheet and a laminate comprising a cured adhesive sheet were produced in a manner similar to that of Example 1 using the radiation-curable adhesive sheet obtained as described above.

Comparative Example 5 (CE-5)

After producing a radiation-curable adhesive sheet in a manner similar to that of Example 1, the 8172P was peeled off the silicone release-treated film, and the front and rear surfaces thereof were then irradiated using a low-pressure mercury lamp for 10 minutes each to produce a first cured adhesive sheet according to the present example. Peeling off the 8172P before performing UV irradiation meant that radiation also comprising short-wavelength radiation of a first wavelength, in this case about 370 nm or less, was also applied. The total amount of irradiated UV energy applied to the front surface over 10 minutes as measured using a Topcon Technohouse UVR-2/UD-40 was approximately 1,600 mJ/cm$^2$.

A laminate comprising the first cured adhesive sheet was produced in a manner similar to that of Example 1.

Example 6

Figure 5:
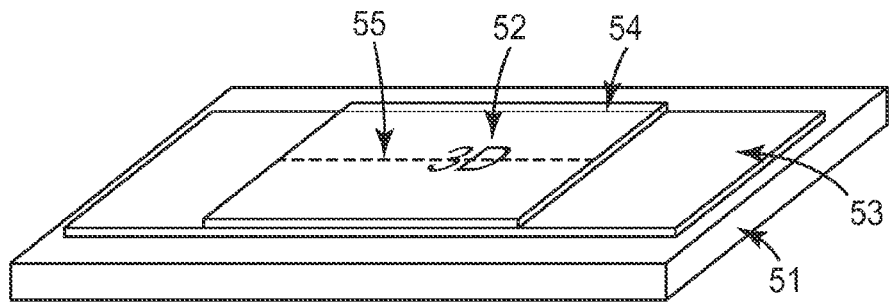
FIG. 5 is a perspective view of one embodiment of a laminate comprising a radiation-curable adhesive sheet.

As shown in FIG. 5, characters 52 reading "3D" were printed on the surface of float glass 51 (40 mm×70 mm×0.55 mm) via silk screen printing. The thickness (height) of the printed characters was adjusted to 7 μm, and the size to approximately 4 mm×8 mm. The radiation-curable adhesive sheet 53 produced in Example 1 was applied to the surface of the printed glass using a hand roller, and a cover glass 54 (24 mm×32 mm×0.15 mm) was then placed thereupon. Because of the low thickness thereof, the cover glass can be considered sensitive to warping. The whole construction was placed into an autoclave and processed for 30 minutes at 0.5 MPa and 60° C. to produce a laminate comprising a radiation-curable adhesive sheet (FIG. 5).

Next, UV irradiation was performed using an F-300 UV irradiator (H bulb, 120 W/cm) manufactured by Fusion UV Systems Japan from the side of the cover glass, the radiation-curable adhesive sheet was irradiated with short-wavelength radiation of a wavelength less than a first wavelength, in this case about 370 nm, and a laminate comprising a cured adhesive sheet was produced. The total amount of UV energy as measured using an EIT UV POWER PUCK® II UV meter was 2,214 mJ/cm$^2$ for UV-A (from 320 to 390 nm), 1,692 mJ/cm$^2$ for UV-B (from 280 to 320 nm), 196 mJ/cm$^2$ for UV-C (from 250 to 260 nm), and 2,232 mJ/cm$^2$ for UV-V (from 395 to 445 nm).

Comparative Example 7 (CE-7)

A laminate comprising a cured adhesive sheet was produced in a manner similar to that of Example 6, except that the first cured adhesive sheet produced in Comparative Example 5 via irradiation with radiation also comprising short-wavelength radiation of a first wavelength or less was used.

<Evaluation Methods>

The properties of the radiation-curable adhesive sheet, laminate comprising a radiation-curable adhesive sheet, and laminate comprising a cured adhesive sheet, according to the present disclosure, were measured according to the following methods.

<Storage Modulus (G') and Loss Tangent (Tan δ) of the Radiation-Curable Adhesive Sheet (Dynamic Mechanical Analysis)>

Figure 6:
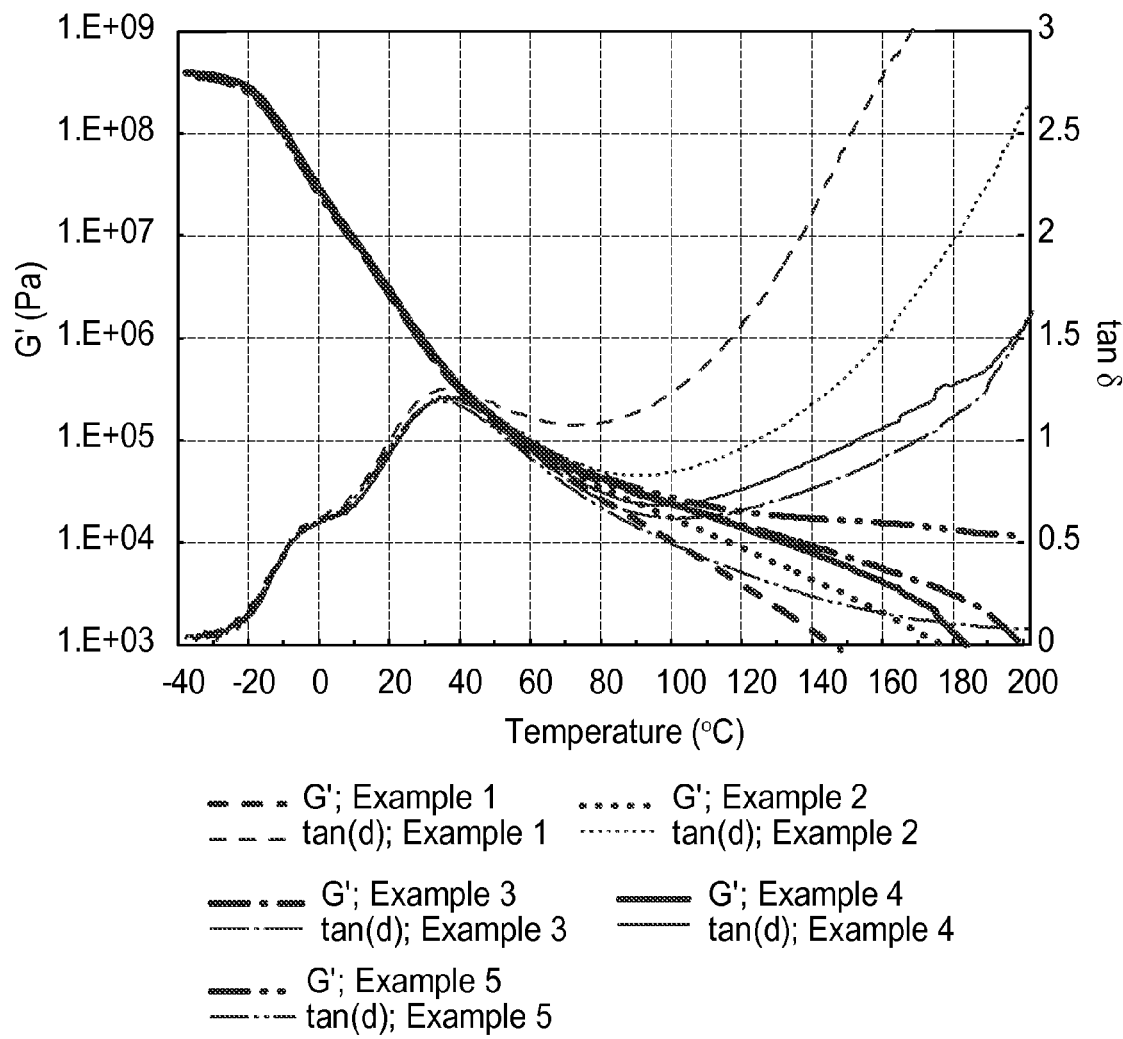
FIG. 6 shows the storage modulus (G') and loss tangent (tan δ) of the radiation-curable adhesive sheets according to the present disclosure.

In order to evaluate the G' and tan δ of the radiation-curable adhesive sheets according to each example, dynamic mechanical analysis (DMA) was performed using an ARES dynamic viscoelastometer (TA Instruments, New Castle, Del.). A test strip produced by layering radiation-curable adhesive sheets to a thickness of approximately 3 mm and punching using an 8 mm φ punch blade was used for measurement. Measurement was performed in shear mode (1 Hz) at a temperature increase rate of 5° C./minute over a temperature range from −40° C. to 200° C. Results for G' and tan δ are shown in FIG. 6, and G' at 80° C. in Table 1.

TABLE 1

| | Example 1 | Example 2 | Example 3 | Example 4 | CE-5 |
|---|---|---|---|---|---|
| G' (Pa) | $2.7 \times 10^4$ | $3.5 \times 10^4$ | $2.7 \times 10^4$ | $4.0 \times 10^4$ | $4.5 \times 10^4$ |

<Ink Level Difference Conformance Test>
(Example 1 and Comparative Example 5)

Figure 7:
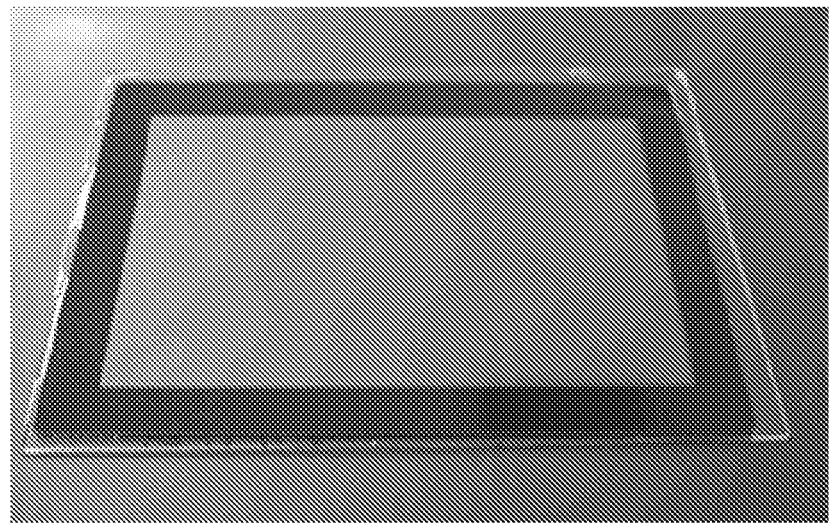
FIG. 7 shows results for an ink level difference conformance test.
Figure 8:
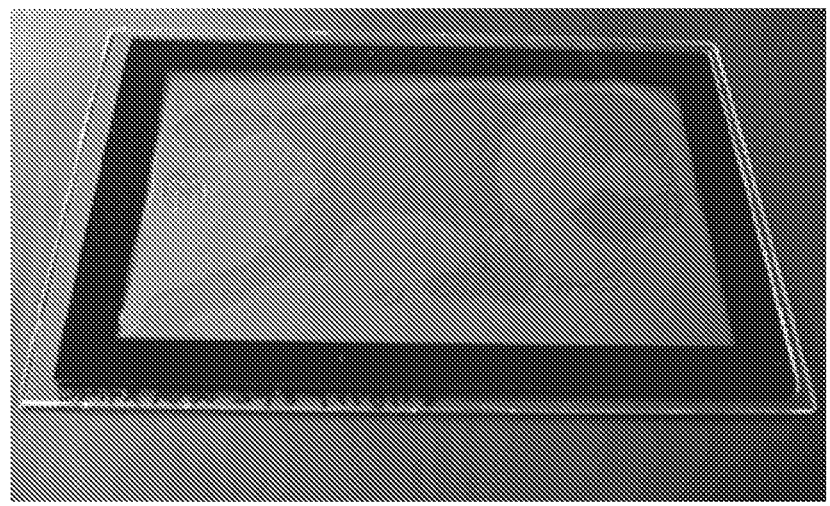
FIG. 8 shows results for an ink level difference conformance test.

The laminate comprising the radiation-curable adhesive sheets according to Example 1 and the laminates comprising the first cured adhesive sheet according to Comparative Example 5 were left in an autoclave for 30 minutes at 60° C. and 0.5 MPa, then visually observed. While no air pockets were observed in the laminate according to Example 1, as shown in FIG. 7, large air pockets were observed in Comparative Example 5, as shown in FIG. 8, confirming that the first cured adhesive sheet did not conform to the raised ink section printed on the circumference of the glass sheet.

The laminate comprising a radiation-curable adhesive sheet according to Example 1 was then left in an oven for 24 hours at 85° C. and for 24 hours at 65° C. and 95% humidity. No air pockets were observed in either case.

<Warping Measurement> (Example 6 and Comparative Example 7)

Figure 9:
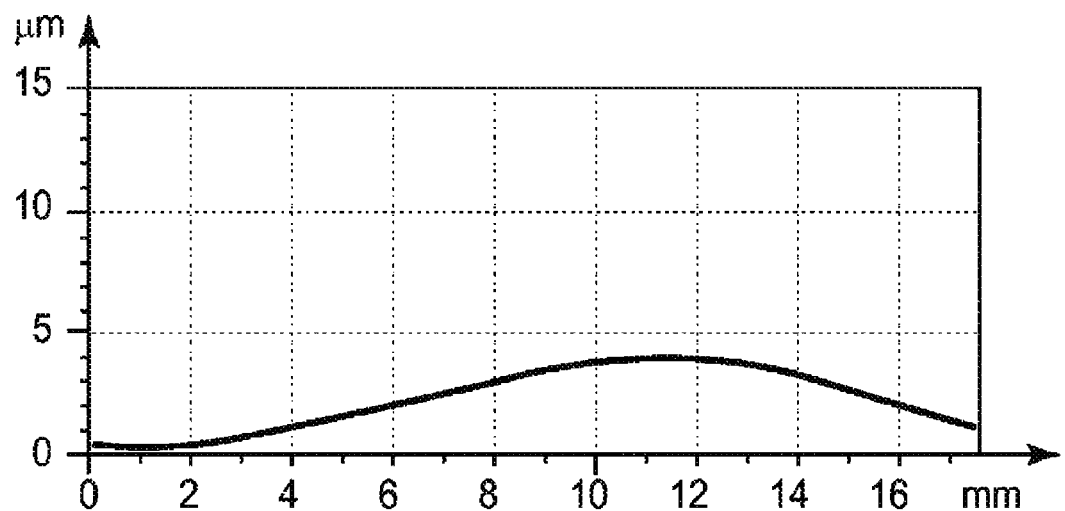
FIG. 9 shows warping measurement results.
Figure 10:
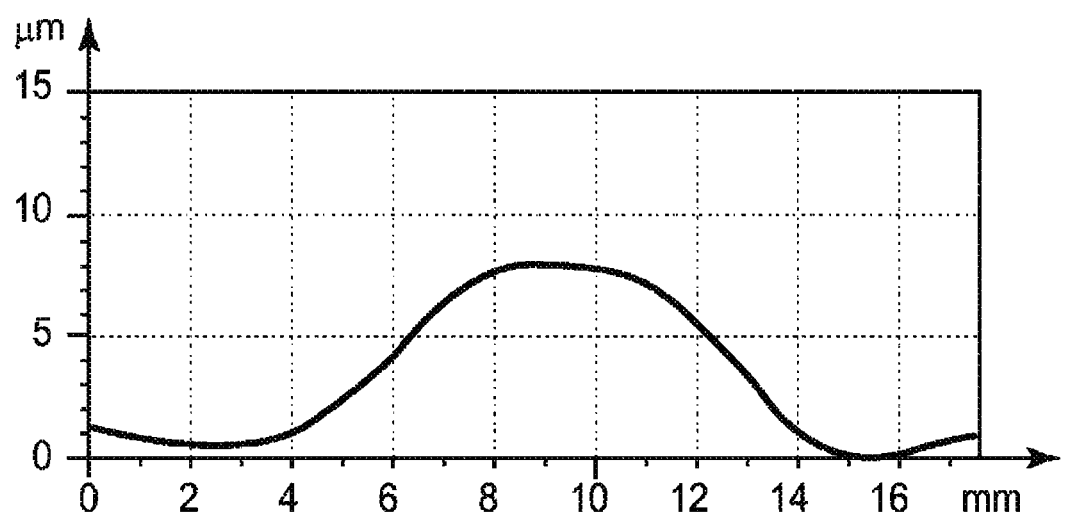
FIG. 10 shows warping measurement results.

The laminate comprising radiation-curable adhesive sheet according to Example 6 and the laminate comprising the first cured adhesive sheet according to Comparative Example 7 were placed upon the stage of an Talysurf CCI 6000 Optical 3D Profiler (available from Taylor Hobson Ltd, a subsidiary of AMETEK Inc, Paoli, Pa.), and warping in the surface of the cover glass was measured. A 17.5 mm×7.0 mm area centered on the printed characters was measured. Cross sections of the measured 3D profile (FIG. 5, 55) are shown in FIG. 9 (Example 6) and FIG. 10 (Comparative Example 7). The radiation-curable adhesive sheet according to Comparative Example 7, which was produced via irradiation with radiation also comprising short-wavelength radiation of a first wavelength or less, did not successfully conform to the raised printed area, and warping in the surface of the cover glass was confirmed.

REFERENCE NUMERALS

10 Image display device
20 Touch panel unit
1 Image display modules
2 Laminate
3 Cured adhesive sheet
4 Surface-protecting layer
5 Continuous layer
6 Light-blocking layer
7 Touch panel

The invention claimed is:

1. A method for producing a laminate comprising a first substrate, a second substrate, and a cured adhesive sheet disposed between the first substrate and the second substrate, wherein at least one of the first substrate and the second substrate has a three-dimensional surface topography over at least a part of a surface thereof, the method comprising the steps of:
   forming into a sheet a radiation-curable adhesive sheet precursor comprising:
      a polymer/monomer mixture comprising a partially polymerized (meth)acrylic monomer,
      a monomer having radiation reactive sites activated by short-wavelength radiation of a first wavelength or less; and
      a photoinitiator for initiating polymerization of the polymer/monomer mixture and the radiation reactive site-possessing monomer via radiation of a wavelength greater than the first wavelength;
   irradiating the precursor with radiation of a wavelength greater than the first wavelength to polymerize the radiation-curable adhesive sheet precursor to form a radiation-curable adhesive sheet;
   disposing the radiation-curable adhesive sheet adjacent to at least one surface of the first substrate;
   disposing the second substrate adjacent to the radiation-curable adhesive sheet;
   applying heat and/or pressure to the radiation-curable adhesive sheet to make the sheet conform to the three-dimensional surface topography; and
   irradiating the radiation-curable adhesive sheet with radiation comprising the short-wavelength radiation of the first wavelength or less to obtain the cured adhesive sheet.

2. A method for producing a laminate comprising a first substrate, a second substrate and an adhesive sheet disposed between the first substrate and the second substrate, wherein at least one of the first substrate and the second substrate is sensitive to warping, the method comprising the steps of:
   forming into a sheet a radiation-curable adhesive sheet precursor comprising a polymer/monomer mixture comprising a partially polymerized (meth)acrylic monomer, a monomer having radiation reactive sites activated by short-wavelength radiation of first wavelength or less, and a photoinitiator for initiating polymerization of the polymer/monomer mixture and the radiation reactive site-possessing monomer via radiation of a wavelength greater than the first wavelength;
   irradiating the precursor with radiation of a wavelength greater than the first wavelength to polymerize the radiation-curable adhesive sheet forming a radiation-curable adhesive sheet;
   disposing the radiation-curable adhesive sheet adjacent to at least one surface of the first substrate;
   disposing the second substrate adjacent to the radiation-curable adhesive sheet;
   applying heat and/or pressure to the radiation-curable adhesive sheet; and
   irradiating the radiation-curable adhesive sheet with radiation comprising radiation comprising short-wavelength radiation of the first wavelength or less to obtain the cured adhesive sheet.

3. The method for producing a laminate according to claim 1, wherein the first wavelength is from 200 nm to 380 nm.

4. The method for producing a laminate according to claim 1, wherein a thickness of the radiation-curable adhesive sheet is at least 100 μm.

5. The method for producing a laminate according to claim 1, wherein a storage modulus of the radiation-curable adhesive sheet is no more than $4.0 \times 10^4$ Pa at 80° C. and 1 Hz.

6. The method for producing a laminate according to claim 1, wherein the radiation reactive sites have a benzophenone structure.

7. The method for producing a laminate according to claim 1, wherein the radiation-curable adhesive sheet precursor further comprises a polymerization-delaying agent.

8. The method for producing a laminate according to claim 2, wherein the first wavelength is from 200 nm to 380 nm.

9. The method for producing a laminate according to claim 2, wherein a thickness of the radiation-curable adhesive sheet is at least 100 μm.

10. The method for producing a laminate according to claim 2, wherein a storage modulus of the radiation-curable adhesive sheet is no more than $4.0 \times 10^4$ Pa at 80° C. and 1 Hz.

11. The method for producing a laminate according to claim 2, wherein the radiation reactive sites have a benzophenone structure.

12. The method for producing a laminate according to claim 2, wherein the radiation-curable adhesive sheet precursor further comprises a polymerization-delaying agent.

* * * * *